(12) United States Patent
Kim et al.

(10) Patent No.: US 9,979,560 B2
(45) Date of Patent: May 22, 2018

(54) DIAGNOSTIC APPARATUS AND METHOD FOR HOME APPLIANCE

(75) Inventors: Deoghyeon Kim, Seoul (KR);
Keunhyung Lee, Seoul (KR);
Hyunsang Kim, Seoul (KR);
Moonhyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 656 days.

(21) Appl. No.: 13/588,164

(22) Filed: Aug. 17, 2012

(65) Prior Publication Data
US 2013/0066593 A1  Mar. 14, 2013

(30) Foreign Application Priority Data

Aug. 18, 2011 (KR) ........................ 10-2011-0082311

(51) Int. Cl.
*G21C 17/00* (2006.01)
*H04L 12/28* (2006.01)

(52) U.S. Cl.
CPC ...... *H04L 12/2825* (2013.01); *H04L 12/2836* (2013.01)

(58) Field of Classification Search
CPC .................. H04L 12/2836; H04L 12/2825
USPC ................................................ 702/182, 185
See application file for complete search history.

(56) References Cited

U.S. PATENT DOCUMENTS

| | | | |
|---|---|---|---|
| 3,910,322 A | 10/1975 | Hardesty et al. | |
| 4,146,754 A | 3/1979 | Rose | |
| 4,241,337 A | 12/1980 | Prada | |
| 4,766,505 A | 8/1988 | Nakano et al. | |
| 4,797,656 A | 1/1989 | Keppler | |
| 4,897,659 A | 1/1990 | Mellon | |
| 4,897,857 A | 1/1990 | Wakatsuki et al. | |
| 4,916,439 A | 4/1990 | Estes et al. | |
| 4,977,394 A | 12/1990 | Manson et al. | |
| 5,103,214 A | 4/1992 | Curran et al. | |
| 5,210,784 A | 5/1993 | Wang et al. | |
| 5,268,666 A | 12/1993 | Michel et al. | |

(Continued)

FOREIGN PATENT DOCUMENTS

| | | |
|---|---|---|
| CA | 2 722 912 | 11/2009 |
| CN | 1212304 | 3/1999 |

(Continued)

OTHER PUBLICATIONS

U.S. Office Action issued in U.S. Appl. No. 12/757,232 dated Apr. 18, 2013.

(Continued)

*Primary Examiner* — Stephanie Bloss
(74) *Attorney, Agent, or Firm* — Ked & Associates LLP

(57) ABSTRACT

The present disclosure relates to diagnostic apparatus and method for home appliance which make it easy to diagnose a breakdown of a home appliance, using a signal including product information and outputted from the home appliance, in which a signal is converted in accordance with signal distortion generated in the process of transmitting the output signal or in a terminal, so that the product information of the home appliance is easily extracted, accuracy of a diagnosis result is improved, an after-sales service for a breakdown of the home appliance is easily provided, and reliability of the product is improved by the improvement of accuracy of the diagnosis result.

18 Claims, 5 Drawing Sheets

(56) References Cited

U.S. PATENT DOCUMENTS

| | | | |
|---|---|---|---|
| 5,287,084 A | 2/1994 | Sone | |
| 5,452,344 A | 9/1995 | Larson | |
| 5,506,892 A | 4/1996 | Kojima et al. | |
| 5,586,174 A | 12/1996 | Bogner et al. | |
| 5,664,218 A | 9/1997 | Kim et al. | |
| 5,757,643 A | 5/1998 | Kuroda et al. | |
| 5,774,529 A | 6/1998 | Johannsen et al. | |
| 5,787,724 A | 8/1998 | Pohl | |
| 5,864,828 A | 1/1999 | Atkins | |
| 5,939,992 A | 8/1999 | Devries et al. | |
| 5,940,915 A | 8/1999 | Nam | |
| 5,987,105 A | 11/1999 | Jenkins et al. | |
| 6,121,593 A | 9/2000 | Mansbery et al. | |
| 6,157,313 A | 12/2000 | Emmermann | |
| 6,370,890 B2 | 4/2002 | Roh | |
| 6,424,252 B1 | 7/2002 | Adler | |
| 6,727,814 B2 | 4/2004 | Saltzstein et al. | |
| 6,759,954 B1 | 7/2004 | Myron et al. | |
| 6,763,458 B1 | 7/2004 | Watanabe et al. | |
| 6,778,868 B2 | 8/2004 | Imamura et al. | |
| 6,784,801 B2 | 8/2004 | Watanabe et al. | |
| 6,870,480 B2 | 3/2005 | Suzuki et al. | |
| 6,873,255 B2 | 3/2005 | Gallagher | |
| 6,906,617 B1 | 6/2005 | Van der Meulen | |
| 7,010,612 B1 | 3/2006 | Si et al. | |
| 7,135,982 B2 | 11/2006 | Lee | |
| 7,174,264 B2 | 2/2007 | Yasukawa et al. | |
| 7,208,916 B1 | 4/2007 | Boatwright | |
| 7,243,174 B2 | 7/2007 | Sheahan et al. | |
| 7,266,164 B2 | 9/2007 | Jeon et al. | |
| 7,280,643 B2 | 10/2007 | Howard et al. | |
| 7,337,457 B2 | 2/2008 | Pack et al. | |
| 7,363,031 B1 | 4/2008 | Aisa | |
| 7,383,644 B2 | 6/2008 | Lyu et al. | |
| 7,439,439 B2 | 10/2008 | Hayes et al. | |
| 7,509,824 B2 | 3/2009 | Park et al. | |
| 7,558,700 B2 | 7/2009 | Yamashita et al. | |
| 7,574,269 B2 | 8/2009 | Cenedese et al. | |
| 7,631,063 B1 | 12/2009 | Ho et al. | |
| 7,648,476 B2 | 1/2010 | Bock et al. | |
| 7,653,512 B2 | 1/2010 | Cheung et al. | |
| 7,750,227 B2 | 7/2010 | Hayes et al. | |
| 7,843,919 B2 | 11/2010 | Benveniste | |
| 7,965,632 B2 | 6/2011 | Sugaya | |
| 8,027,752 B2 | 9/2011 | Castaldo et al. | |
| 8,040,234 B2 | 10/2011 | Ebrom et al. | |
| 8,045,636 B1 | 10/2011 | Lee et al. | |
| 8,132,049 B2 | 3/2012 | Yasukawa et al. | |
| 8,204,189 B2 | 6/2012 | Rhodes et al. | |
| 8,325,054 B2 | 12/2012 | Kim et al. | |
| 8,346,508 B2 | 1/2013 | Kim et al. | |
| 8,391,255 B2 | 3/2013 | Ribiere et al. | |
| 8,428,910 B2 | 4/2013 | Papadimitriou et al. | |
| 8,739,057 B2 | 5/2014 | Cheong | |
| 2002/0029575 A1 | 3/2002 | Okamoto | |
| 2002/0032491 A1 | 3/2002 | Imamura et al. | |
| 2002/0078742 A1 | 6/2002 | Kim | |
| 2002/0097161 A1 | 7/2002 | Deeds | |
| 2002/0116959 A1 | 8/2002 | Ohta et al. | |
| 2002/0120728 A1 | 8/2002 | Braatz et al. | |
| 2003/0000240 A1 | 1/2003 | Pahl | |
| 2003/0028345 A1 | 2/2003 | Watkins et al. | |
| 2003/0058101 A1 | 3/2003 | Watanabe et al. | |
| 2003/0144010 A1 | 4/2003 | Dollinger | |
| 2003/0110363 A1 | 6/2003 | Bachot et al. | |
| 2003/0128850 A1 | 7/2003 | Kimura et al. | |
| 2003/0167782 A1 | 9/2003 | Roh et al. | |
| 2003/0196492 A1 | 10/2003 | Remboski et al. | |
| 2004/0032853 A1 | 2/2004 | D'Amico et al. | |
| 2004/0132444 A1 | 7/2004 | Herrmann | |
| 2004/0158333 A1 | 8/2004 | Ha et al. | |
| 2004/0211228 A1 | 10/2004 | Nishio et al. | |
| 2004/0249903 A1 | 12/2004 | Ha et al. | |
| 2004/0261468 A1 | 12/2004 | Lueckenbach | |
| 2005/0015890 A1 | 1/2005 | Kim et al. | |
| 2005/0028034 A1 | 2/2005 | Gantman et al. | |
| 2005/0029976 A1 | 2/2005 | Terry et al. | |
| 2005/0062600 A1 | 3/2005 | Olsen | |
| 2005/0086979 A1 | 4/2005 | Son et al. | |
| 2005/0129200 A1 | 6/2005 | Forrest et al. | |
| 2005/0134472 A1 | 6/2005 | Jang et al. | |
| 2005/0162909 A1 | 7/2005 | Wooldridge | |
| 2005/0222859 A1 | 10/2005 | Ha | |
| 2006/0048405 A1 | 3/2006 | Baek et al. | |
| 2006/0066758 A1 | 3/2006 | Higashihara | |
| 2006/0089818 A1 | 4/2006 | Norell et al. | |
| 2006/0136544 A1 | 6/2006 | Atsmon et al. | |
| 2006/0168740 A1 | 8/2006 | Ha et al. | |
| 2006/0259199 A1 | 11/2006 | Gjerde et al. | |
| 2007/0097622 A1 | 5/2007 | Leech | |
| 2007/0113595 A1 | 5/2007 | Harwood et al. | |
| 2007/0114293 A1 | 5/2007 | Gugenheim | |
| 2007/0137265 A1 | 6/2007 | Shikamori et al. | |
| 2007/0175883 A1 | 8/2007 | Miu et al. | |
| 2007/0189323 A1 | 8/2007 | Swoboda et al. | |
| 2007/0219756 A1 | 9/2007 | Frankel et al. | |
| 2007/0254604 A1 | 11/2007 | Kim | |
| 2007/0272286 A1 | 11/2007 | Curtius et al. | |
| 2008/0007520 A1 | 1/2008 | Lee | |
| 2008/0036619 A1 | 2/2008 | Rhodes et al. | |
| 2008/0037011 A1 | 2/2008 | Rookie | |
| 2008/0072383 A1 | 3/2008 | Bextermoller et al. | |
| 2008/0122648 A1 | 5/2008 | Ebrom et al. | |
| 2008/0181058 A1 | 7/2008 | Hayakawa | |
| 2009/0036778 A1 | 2/2009 | Cohen et al. | |
| 2009/0067102 A1 | 3/2009 | Cline et al. | |
| 2009/0077167 A1 | 3/2009 | Baum | |
| 2009/0160637 A1 | 6/2009 | Maeng | |
| 2009/0165471 A1 | 7/2009 | Rafalovich | |
| 2009/0165475 A1 | 7/2009 | Wasserman | |
| 2009/0169434 A1 | 7/2009 | Ogusu | |
| 2009/0217682 A1 | 9/2009 | Son | |
| 2009/0248245 A1 | 10/2009 | Sumiya | |
| 2009/0257354 A1 | 10/2009 | Hannel | |
| 2009/0282308 A1 | 11/2009 | Gutsche et al. | |
| 2009/0289536 A1 | 11/2009 | Park | |
| 2009/0323913 A1 | 12/2009 | Lee et al. | |
| 2009/0323914 A1* | 12/2009 | Lee | H04L 12/2825 379/106.01 |
| 2010/0023938 A1 | 1/2010 | Lee et al. | |
| 2010/0027770 A1* | 2/2010 | Park | H04B 11/00 379/106.01 |
| 2010/0037401 A1 | 2/2010 | Bae et al. | |
| 2010/0116060 A1 | 5/2010 | Murayama | |
| 2010/0262865 A1* | 10/2010 | Kim | D06F 39/005 714/37 |
| 2010/0318324 A1 | 12/2010 | Kim et al. | |
| 2011/0018729 A1 | 1/2011 | Kim et al. | |
| 2011/0022358 A1 | 1/2011 | Han et al. | |
| 2011/0054845 A1 | 3/2011 | Han et al. | |
| 2011/0060553 A1 | 3/2011 | Han et al. | |
| 2011/0074589 A1* | 3/2011 | Han | H04L 12/2825 340/618 |
| 2011/0200189 A1 | 8/2011 | True et al. | |

FOREIGN PATENT DOCUMENTS

| | | |
|---|---|---|
| CN | 1343862 | 4/2002 |
| CN | 1393672 | 1/2003 |
| CN | 1409886 | 4/2003 |
| CN | 1424843 | 6/2003 |
| CN | 1497915 | 5/2004 |
| CN | 1606282 | 4/2005 |
| CN | 1690685 | 11/2005 |
| CN | 2797999 | 7/2006 |
| CN | 101202639 | 6/2008 |
| CN | 101447119 | 6/2009 |
| CN | 101680693 | 3/2010 |
| CN | 102017519 | 4/2011 |
| CN | 102017520 | 4/2011 |
| CN | 102017593 | 4/2011 |
| CN | 102388572 | 3/2012 |
| CN | 102388574 | 3/2012 |

(56) References Cited

FOREIGN PATENT DOCUMENTS

| | | |
|---|---|---|
| CN | 102498691 | 6/2012 |
| CN | 102915004 | 2/2013 |
| CN | 103053136 | 4/2013 |
| EP | 0 038 687 | 10/1981 |
| EP | 0 510 519 | 10/1992 |
| EP | 0 617 557 | 9/1994 |
| EP | 0 691 060 | 1/1996 |
| EP | 0 742 308 | 11/1996 |
| EP | 0 846 991 | 6/1998 |
| EP | 0 851 054 | 7/1998 |
| EP | 0 887 989 | 12/1998 |
| EP | 1 186 694 | 3/2002 |
| EP | 1 186 695 | 3/2002 |
| EP | 2 180 648 | 4/2010 |
| JP | 04-241563 | 8/1992 |
| JP | 4-358497 | 12/1992 |
| JP | 04-358497 | 12/1992 |
| JP | 07-239176 | 9/1995 |
| JP | 10-133767 | 5/1998 |
| JP | 11-127254 | 5/1999 |
| JP | 11-127254 | 11/1999 |
| JP | 2001-345949 | 12/2001 |
| JP | 2001-353395 | 12/2001 |
| JP | 2002-000988 | 1/2002 |
| JP | 2002-011274 | 1/2002 |
| JP | 2002-031471 | 1/2002 |
| JP | 2002-045590 | 2/2002 |
| JP | 2002-85887 | 3/2002 |
| JP | 2002-162149 | 6/2002 |
| JP | 2002-279091 | 9/2002 |
| JP | 2003-172578 | 6/2003 |
| JP | 2004-085071 | 3/2004 |
| JP | 2004-215125 | 7/2004 |
| JP | 2005-061757 | 3/2005 |
| JP | 2005-273943 | 10/2005 |
| JP | 2007-267956 | 10/2007 |
| JP | 2008-003562 | 1/2008 |
| KR | 10-1991-0020404 | 12/1991 |
| KR | 10-1996-0003308 | 1/1996 |
| KR | 10-1997-0019443 | 4/1997 |
| KR | 10-0127232 | 10/1997 |
| KR | 10-0143209 | 8/1998 |
| KR | 10-1999-020285 | 3/1999 |
| KR | 20-1999-0040564 U | 12/1999 |
| KR | 20-0162050 | 12/1999 |
| KR | 10-2000-0018678 | 4/2000 |
| KR | 10-2001-0063913 | 5/2001 |
| KR | 10-2001-0055394 | 7/2001 |
| KR | 10-2002-0020831 | 3/2002 |
| KR | 10-2002-0030426 | 4/2002 |
| KR | 10-2002-0039959 | 5/2002 |
| KR | 10-2003-0000189 | 1/2003 |
| KR | 10-2004-0050767 | 6/2004 |
| KR | 10-2004-0095017 | 11/2004 |
| KR | 10-2004-0103352 | 12/2004 |
| KR | 10-2005-0062747 | 6/2005 |
| KR | 10-2005-0097282 | 10/2005 |
| KR | 10-2006-0056973 | 5/2006 |
| KR | 10-2006-0103014 | 9/2006 |
| KR | 10-0641974 | 11/2006 |
| KR | 10-2007-0013090 | 1/2007 |
| KR | 10-2008-0068447 | 7/2008 |
| KR | 10-0887575 | 3/2009 |
| KR | 10-2009-0115066 | 11/2009 |
| KR | 10-2010-0112950 | 10/2010 |
| KR | 10-2011-0010375 | 2/2011 |
| KR | 10-2011-0010378 | 2/2011 |
| WO | WO 01/11575 | 2/2001 |
| WO | WO 2001/050669 A1 | 7/2001 |
| WO | WO 2005/106096 | 11/2005 |
| WO | WO 2008/010670 | 1/2008 |
| WO | WO 2008/117981 | 10/2008 |
| WO | WO 2009/134090 | 11/2009 |
| WO | WO 2011/087329 | 7/2011 |

OTHER PUBLICATIONS

U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued in U.S. Appl. No. 12/432,111 dated Jun. 13, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
U.S. Office Action issued in U.S. Appl. No. 12/847,406 dated Jul. 9, 2013.
U.S. Office Action issued in U.S. Appl. No. 12/847,306 dated Jul. 9, 2013.
Japanese Office Action dated Oct. 29, 2013.
U.S. Office Action issued in U.S. Appl. No. 12/847,272 dated Dec. 2, 2013.
U.S. Office Action issued in U.S. Appl. No. 12/847,284 dated Dec. 4, 2013.
U.S. Office Action issued in U.S. Appl. No. 12/847,406 dated Dec. 17, 2013.
U.S. Office Action issued in U.S. Appl. No. 12/847,306 dated Dec. 17, 2013.
U.S. Office Action issued in U.S. Appl. No. 12/432,111 dated Nov. 15, 2012.
Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
U.S. Office Action issued in U.S. Appl. No. 12/432,132 dated Dec. 19, 2012.
U.S. Office Action issued in U.S. Appl. No. 12/850,240 dated Dec. 27, 2012.
U.S. Office Action issued in U.S. Appl. No. 12/846,013 dated Dec. 28, 2012.
U.S. Notice of Allowance issued in U.S. Appl. No. 12/847,303 dated Jan. 11, 2013.
U.S. Office Action issued in U.S. Appl. No. 12/431,903 dated Jan. 2, 2013.
U.S. Office Action issued in U.S. Appl. No. 12/757,246 dated Jan. 17, 2013.
U.S. Office Action issued in U.S. Appl. No. 12/431,893 dated Jan. 29, 2013.
Chinese Office Action dated Dec. 16, 2013.(translation).
European Office Action dated Jan. 7, 2014. (11803799.3).
European Office Action dated Jan. 7, 2014. (11803798.5).
Australian Office Action dated Jan. 13, 2014.
Korean Office Action dated Jan. 28, 2014.
Japanese Office Action dated Feb. 4, 2014.
Korean Office Action dated Feb. 26, 2014.
Korean Office Action dated Feb. 28, 2014.
Chinese Office Action dated Mar. 4, 2014.
Chinese Office Action dated Mar. 5, 2014.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
Creber, R. K. et al.; "Performance of Undersea Acoustic Networking Using RTS/CTS Handshaking and ARQ Retransmission"; OCEANS, 2001 MTS/IEEE Conference and Exhibition; Nov. 5-8, 2001; Piscataway, NJ; IEEE, vol. 4; Nov. 5, 2001; pp. 2083-2086 (XP010566758).
International Search Report dated Dec. 18, 2009 issued in Application No. PCT/KR2009/002288.
International Search Report dated Dec. 21, 2009 issued in Application No. PCT/KR2009/002199.
International Search Report dated Jan. 4, 2010 issued in Application No. PCT/KR2009/002211.

(56) References Cited

OTHER PUBLICATIONS

International Search Report dated Aug. 23, 2010 issued in Application No. PCT/KR2010/000319.
International Search Report dated Dec. 1, 2010 issued in Application No. PCT/KR2010/002222.
International Search Report dated Dec. 1, 2010 issued in Application No. PCT/KR2010/002211.
International Search Report dated Apr. 25, 2011 issued in Application No. PCT/KR 2010/004407.
International Search Report dated May 26, 2011 issued in Application No. PCT/KR2010/005108.
International Search Report issued in Application No. PCT/KR2011/000311 dated Jul. 28, 2011.
European Search Report dated Oct. 14, 2011 issued in Application No. 09 73 8950.
United States Office Action dated Dec. 27, 2011 issued in U.S. Appl. No. 12/432,184.
United States Office Action dated Feb. 10, 2012 issued in U.S. Appl. No. 12/568,022.
United States Office Action dated Feb. 14, 2012 issued in U.S. Appl. No. 12/431,910.
United States Office Action dated Mar. 1, 2012 issued in U.S. Appl. No. 12/846,040.
Russian Office Action dated Feb. 7, 2012. (with translation).
U.S. Office Action issued in U.S. Appl. No. 12/431,903 dated Mar. 8, 2012.
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in U.S. Appl. No. 12/757,205 dated Apr. 2, 2012.
U.S. Office Action issued in U.S. Appl. No. 12/432,111 dated May 2, 2012.
European Search Report dated May 8, 2012.
U.S. Office Action issued in U.S. Appl. No. 12/757,246 dated May 18, 2012.
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
U.S. Office Action issued in U.S. Appl. No. 12/603,810 dated Jul. 5, 2012.
U.S. Office Action issued in U.S. Appl. No. 12/431,910 dated Jul. 23, 2012.
U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Korean Office Action dated Aug. 13, 2012.
Japanese Office Action dated Sep. 11, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
U.S. Office Action issued in U.S. Appl. No. 12/432,184 dated May 22, 2014.
Korean Office Action dated May 26, 2014.
U.S. Notice of Allowance issued in U.S. Appl. No. 12/757,339 dated May 28, 2014.
U.S. Office Action issued in U.S. Appl. No. 13/382,334 dated Jun. 5, 2014.
Russian Office Action issued in Application No. 2010144513/08 dated Jun. 27, 2012.
Notice of Allowance issued in U.S. Appl. No. 12/846,040 dated Aug. 17, 2012.
Chinese Office Action dated Jun. 27, 2013.
U.S. Office Action issued in U.S. Appl. No. 12/431,893 dated Jul. 30, 2013.
U.S. Office Action issued in U.S. Appl. No. 12/757,339 dated Sep. 6, 2013.
U.S. Office Action issued in U.S. Appl. No. 12/842,649 dated Aug. 15, 2014.
U.S. Notice of Allowance issued in U.S. Appl. No. 13/382,334 dated Nov. 12, 2014.
U.S. Appl. No. 12/431,893, filed Apr. 29, 2009.
U.S. Appl. No. 12/431,910, filed Apr. 29, 2009.
U.S. Appl. No. 12/432,132, filed Apr. 29, 2009.
U.S. Appl. No. 12/551,827, filed Sep. 1, 2009.
U.S. Appl. No. 12/568,022, filed Sep. 28, 2009.
U.S. Appl. No. 12/757,205, filed Apr. 9, 2010.
U.S. Appl. No. 12/757,213, filed Apr. 9, 2010.
U.S. Appl. No. 12/842,679, filed Jul. 23, 2010.
U.S. Appl. No. 12/846,040, filed Jul. 29, 2010.
U.S. Appl. No. 12/847,303, filed Jul. 30, 2010.
European Search Report dated Dec. 17, 2012.
European Search Report dated Jan. 2, 2013.
Ethem M Sözer; "Simulation and Rapid Prototyping Environment for Underwater Acoustic Communications: Reconfigurable Modem"; OCEANS—Europe 2005; MIT Sea Grant College Program; Cambridge, MA, 02139; IEEE; pp. 80-85 (XP10838461A).
U.S. Office Action issued in U.S. Appl. No. 12/757,339 dated Jan. 31, 2013.
European Search Report dated Jan. 31, 2013. (10761908.2).
European Search Report dated Jan. 31, 2013. (10797292.9).
Japanese Office Action dated Feb. 12, 2013. (with translation).
U.S. Office Action issued in U.S. Appl. No. 12/603,810 dated Feb. 13, 2013.
U.S. Office Action issued in U.S. Appl. No. 12/551,827 dated Mar. 11, 2013.
U.S. Office Action issued in U.S. Appl. No. 12/842,649 dated Mar. 22, 2013.
Chinese Office Action dated Oct. 30, 2014.
Japanese Office Action dated Nov. 18, 2014.
Chinese Office Action dated Dec. 3, 2014.
U.S. Notice of Allowance issued in U.S. Appl. No. 13/922,669 dated Dec. 31, 2014.
Australian Office Action dated Sep. 22, 2014.
Chinese Office Action dated Oct. 8, 2014.
U.S. Office Action issued in U.S. Appl. No. 13/562,704 dated Nov. 19, 2014.
U.S. Notice of Allowance issued in U.S. Appl. No. 12/842,649 dated Dec. 10, 2014.
U.S. Appl. No. 12/431,903, filed Apr. 29, 2009.
U.S. Appl. No. 12/432,111, filed Apr. 29, 2009.
U.S. Appl. No. 12/757,339, filed Apr. 9, 2010.
U.S. Appl. No. 12/757,232, filed Apr. 9, 2010.
U.S. Appl. No. 12/757,246, filed Apr. 9, 2010.
U.S. Appl. No. 12/603,810, filed Oct. 22, 2009.
U.S. Appl. No. 12/432,184, filed Apr. 29, 2009.
U.S. Appl. No. 13/382,334, filed Jan. 5, 2012.
U.S. Appl. No. 12/842,649, filed Jul. 23, 2010.
U.S. Appl. No. 12/846,013, filed Jul. 29, 2010.
U.S. Appl. No. 12/847,272, filed Jul. 30, 2010.
U.S. Appl. No. 12/847,406, filed Jul. 30, 2010.
U.S. Appl. No. 12/847,284, filed Jul. 30, 2010.
U.S. Appl. No. 12/847,306, filed Jul. 30, 2010.
U.S. Appl. No. 12/850,240, filed Aug. 4, 2010.
U.S. Appl. No. 13/922,669, filed Jun. 20, 2013.
Korean Notice of Allowance dated Aug. 30, 2013.

(56) References Cited

OTHER PUBLICATIONS

U.S. Office Action issued in U.S. Appl. No. 12/842,649 dated Oct. 8, 2013.
Chinese Office Action dated Oct. 10, 2013.
U.S. Notice of Allowance issued in U.S. Appl. No. 12/846,013 dated Nov. 5, 2013.
U.S. Final Office Action issued in U.S. Appl. No. 13/562,704 dated Apr. 9, 2015.
Russian Office Action issued in Application No. 2013130254 dated Jan. 23, 2015.
European Search Report dated Mar. 23, 2016.
Chinese Office Action dated Feb. 3, 2016.
European Search Report dated Feb. 5, 2016.
U.S. Office Action issued in U.S. Appl. No. 13/933,467 dated Feb. 16, 2016.
U.S. Office Action issued in U.S. Appl. No. 13/522,066 dated Mar. 2, 2016.
U.S. Office Action issued in U.S. Appl. No. 13/808,403 dated Apr. 7, 2016.
U.S. Appl. No. 13/808,414, filed Jan. 4, 2013.
U.S. Appl. No. 13/808,403, filed Jan. 4, 2013.
U.S. Appl. No. 13/522,066, filed Jul. 13, 2012.
U.S. Appl. No. 13/562,704, filed Jul. 31, 2012.
U.S. Appl. No. 13/933,467, filed Jul. 2, 2013.
European Search Report dated Jul. 20, 2016.
U.S. Office Action issued in U.S. Appl. No. 13/808,403 dated Aug. 4, 2016.
U.S. Office Action issued in U.S. Appl. No. 13/522,066 dated Aug. 25, 2016.

\* cited by examiner

DIAGNOSTIC APPARATUS AND METHOD FOR HOME APPLIANCE

CROSS-REFERENCE TO RELATED APPLICATION

This application claims the priority benefit of Korean Patent Application No. 10-2011-0082311, filed on Aug. 18, 2011 in the Korean Intellectual Property Office, the disclosure of which is incorporated herein by reference.

BACKGROUND OF THE INVENTION

1. Field of the invention

The present disclosure relates to diagnostic apparatus and method for home appliances, and more particularly, to diagnostic apparatus and method for home appliances which facilitate accurate diagnosis and an after-sales service by checking the status of home appliances on the basis of the product information of the home appliances, diagnosing a breakdown, and feeding back the diagnosis result.

2. Description of the Related Art

Home appliances store values related to operation, information generated during operation, breakdown information, and the like while performing a predetermined operation, and particularly, when a breakdown occurs, home appliances may allow the user to recognize the statuses of the home appliances by outputting a predetermined alarm. Such home appliances not only simply let the user know completion of an operation or generation of a breakdown, but output detailed breakdown information, using an output unit, for example, a display unit or a lamp.

When a fault or error occurs during operation of a home appliance, the user generally calls an after-sales service center, explains the problem with the home appliance, and asks for a solution to the problem. However, it is not easy for the user to accurately recognize the state of the home appliance and explain that status to the after-sales service center, and so the user has difficulty solving the problem.

In particular, it frequently occurs that a repairer unnecessarily visits the user's home when an abnormal symptom of a home appliance is not due to a breakdown of the home appliance, but actually due to mishandling by the user.

Therefore, the user may solve the abnormal symptom by himself/herself, if the symptom of the home appliance is accurately found out so that a solution for the symptom may be provided.

However, there is a problem in that noise or distortion is generated in accordance with the characteristics of a communication network through which a sound is transmitted, when diagnosing the status of a home appliance by outputting the product information of the home appliance, using a sound, and by analyzing the received sound.

U.S. application Ser. No. 12/431,903 describes setting a symbol time, which is an output time for a frequency of a signal sound, to be a predetermined length to solve the problem in transfer rate in that noise or a signal is not transmitted in accordance with the characteristics of the communication network when outputting a signal sound that outputs the product information of a home appliance with a predetermined sound.

However, although the symbol time is set in consideration of the transfer rate, there is a problem in that distortion is generated in accordance with the characteristics of the communication network while the signal is transmitted to the service center.

Since there is a difference in processing of real-time data and common data particularly for portable terminals, there is a problem in that the service center extracts the accurate product information by receiving the signal.

SUMMARY OF THE INVENTION

The present disclosure has been made in an effort to provide a diagnostic apparatus and method for a home appliance which extracts product information from a signal, output by the home appliance, and diagnosing the home appliance on the basis of the product information.

In an embodiment, the product information including at least one of identification information, setting-up information, operation information, and malfunction information.

Aspects of an invention are defined in the appended independent claims.

The diagnostic apparatus, and associated method, provide improved extraction of product information by addressing problems related to distortion of the signal outputted by the home appliance and/or signal distortion.

Further, it is possible to improve accuracy of the diagnosis of the home appliance by improving the accuracy of the extraction process, by extracting the product information using an improved method which addressed signal distortion, to thereby improve reliability of the diagnosis result. Further, since there is provided an improved method to diagnose the status of a home appliance, the user can themselves determine solutions for problems with the home appliance, so that the overall satisfaction of the user with the home appliance is improved.

BRIEF DESCRIPTION OF THE DRAWINGS

The accompanying drawings, which are included to provide a further understanding of the disclosure and are incorporated in and constitute a part of this application, illustrate embodiment(s) of the invention and together with the description serve to explain the principles of the disclosure. In the drawings.

DETAILED DESCRIPTION OF EMBODIMENTS

Figure 1:
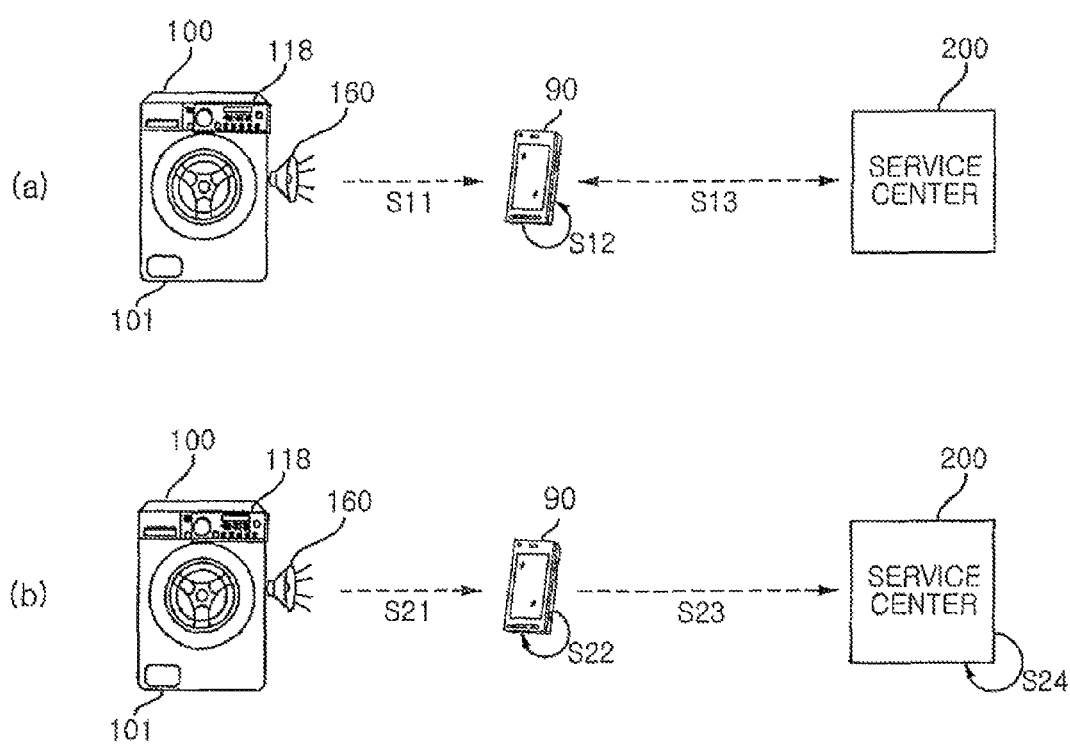
FIG. 1 is a diagram showing the configuration of a diagnostic system for a home appliance which includes a home appliance and a diagnostic apparatus according to an embodiment of the present disclosure.

Hereinafter, embodiments of the present disclosure will be described with reference to the accompanying drawings. The advantages and features of the present disclosure, and methods of achieving them will be clear by referring to the embodiments that will be describe hereafter in detail with reference to the accompanying drawings. However, the present disclosure is not limited to the embodiments described hereafter and may be implemented in various ways, and the embodiments are provided to complete the description. The invention is not restricted to the described embodiments and extended to the full scope of the claims. Like reference numerals indicate like components throughout the specification.

FIG. 1 is a diagram showing the configuration of a diagnostic system for a home appliance according to an exemplary embodiment of the present invention.

Referring to FIG. 1, a diagnostic system according to an embodiment of the present disclosure includes at least one home appliance 100 that outputs production information in a signal and a diagnostic apparatus that extracts the product information from the signal and diagnoses the home appliance 100 on the basis of the extracted information.

In this configuration, the diagnostic apparatus includes at least any one of a portable terminal 90 and a diagnostic server of a service center 200.

The terminal 90 receives or is supplied with a signal from a home appliance and analyzes and converts the signal, and outputs a diagnosis result. In embodiments, the terminal 90 includes a program for diagnosing the home appliance based on information contained in the signal.

In other embodiments, the diagnostic server of the service center 200 receives the signal outputted from the home appliance via the terminal 90 and diagnoses the home appliance, in response to a breakdown report received to the service center. In this configuration, since the diagnostic server is included in the service center 200, the diagnostic server diagnoses the home appliance in response to a breakdown report or a diagnosis request received by the service center 200.

The terminal 90 can diagnose the entire home appliance, depending on the performance of the terminal, but may be provided with a simple diagnosis function including only a portion of the diagnosis function for the status of the home appliance, in some cases.

The home appliance 100, which is an electric device that is installed in a home or a company and provides convenience, may be a refrigerator, a washing machine 101, an oven, or a television. However, the skilled person will understand that other devices may equally benefit from the improved method and apparatus disclosed herein. The home appliance 100 includes a display unit 118 that displays predetermined data and the display unit is a light emitting unit, such as an LED, an LCD, or an organic EL, and visualizes and displays the status information or the breakdown information of the home appliance 100.

Further, the home appliance 100 is equipped with a sound output unit 160, which is a unit outputting sound. In embodiments, information related to the operation, status, and breakdown of the home appliance 100 is transmitted by the appliance though sound emitted by the sound output unit 160.

A predetermined alarm is outputted from the home appliance 100, when a breakdown is generated in the home appliance 100 or the home appliance 100 fails to normally operate due to environmental causes around the home appliance 100 or mishandling by a user, for example. The home appliance 100 outputs an error code or a warning message through the display unit 118, or outputs an alarm through the sound output unit 160.

The user recognizes the status and takes appropriate measures. The user can diagnose the home appliance, using the terminal 90 shown in FIGS. 1A and 1B. As the terminal 90 operates and the program for diagnosing the home appliance is executed, information related to the diagnosis of the home appliance is displayed on the terminal 90.

The user sets the home appliance into a diagnosis mode, in accordance with that displayed on the terminal 90. The home appliance 100 may be equipped with a selecting unit for the user to select the diagnosis mode and the selecting unit may be implemented by an input unit such as a button, a dial, a tactile switch, or a touch pad.

When the user operates the selecting unit and the diagnosis mode is correspondingly activated, the home appliance 100 converts and outputs product information into a signal, such as a signal for driving the sound output unit 160. In embodiments, the product information includes at least one of identification information, setting-up information, operation information, and malfunction information. However, the skilled person will understand that the product information may contain other information related to the status of the product.

The user puts the terminal 90 close to the sound output unit 160 of the home appliance. In this state, the terminal 90 is set in a recordable state and records a signal including the product information outputted from the home appliance. In some cases, it may be possible to receive a signal including the product information as data, when the home appliance and the terminal 90 are connected by a predetermined communication means.

The terminal 90 receives or records the signal outputted from the home appliance (S11 and S21), extracts the product information by analyzing the input signal, and then diagnoses the home appliance on the basis of stored diagnosis data and the product information by executing a diagnosis program (S12 and S22)

Optionally, the terminal 90 may diagnose the home appliance by connecting with the service center 200 and receiving data for diagnosis (S13).

The home appliance is diagnosed by the terminal 90, but in some cases, it may be possible to perform precise diagnosis at the service center 200 (S24) by performing simple diagnosis with the terminal 90 and then by transmitting the diagnosis result from the terminal 90 to the service center 200 (S23). That is, the service center 200 may, in turn, transmit additional information to the terminal 90 which allows for improved or more accurate diagnosis.

In another embodiment, the terminal 90 transmits the product information to the service center 200 (S23) without any diagnosis to allow the diagnostic server of the service center 200 to perform full diagnosis of the home appliance (S24). For example, this embodiment may be preferred when it is determined that diagnosis by the terminal 90 is not possible or when the user selects diagnosis at the service center 200.

When the terminal 90 performs diagnosis, the diagnosis result is, optionally, outputted on the display unit of the terminal 90. The user can see the status of the home appliance from the output and can solve the problem by checking the home appliance or changing the setting-up in accordance with the outputted solution, for example.

When diagnosis is performed through the service center 200, the diagnosis result can be notified to the user by voice or may be notified in a message or an email. The skilled person will understand that other methods may be used for notifying the user.

When the problem is due to a mistake by the user or cannot be solved by the user such as by simply changing the setting-up or cleaning, as the result of diagnosis, the terminal 90 transmits the diagnosis result to the service center 200.

The service center 200 may notify a repairer who will be sent to the user's home to repair the home appliance 100. The repairer is able to check the diagnosis result, notified by the terminal, before visiting the user. Advantageously, the repairer may therefore be able to visit the user after getting the necessary parts for repairing. As it is possible to accurately identify the necessary parts, it is possible to remarkably reduce the likelihood that the repairer will need to visit the user again.

By way of example only, the home appliance 100 is a washing machine in the following description of the present disclosure. However, the present disclosure is not limited thereto and other appliances such as electric rice cookers, microwave ovens, TVs, air conditioners, and refrigerators are equally suitable.

A diagnostic apparatus, a terminal and a diagnostic server of a service center may be used, as described above. By way of example only, the terminal 90 is a diagnostic apparatus in the following description.

Figure 2:
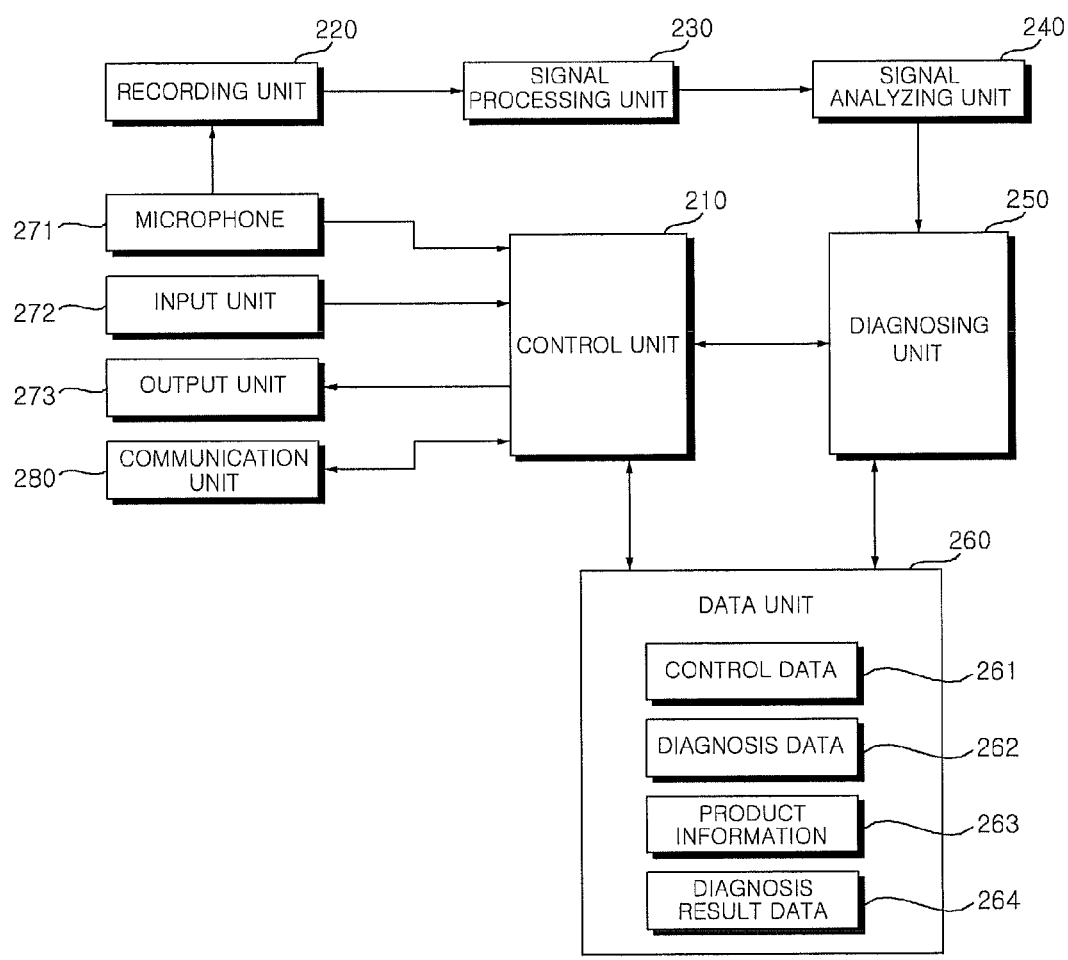
FIG. 2 is a block diagram showing the configuration of a diagnostic apparatus that diagnoses a home appliance according to an embodiment of the present disclosure.

FIG. 2 is a block diagram showing the configuration of a diagnostic apparatus that diagnoses a home appliance according to an embodiment of the present disclosure.

Referring to FIG. 2, a diagnostic apparatus includes a microphone 271, an input unit 272, an output unit 273, a communication unit 280, a signal processing unit 230, a signal analyzing unit 240, a diagnosing unit 250, a data unit 260, and a control unit 210 that controls the entire operation of the diagnostic apparatus.

A diagnosis program for a home appliance is performed by operating the input unit 272, and the sound inputted through the microphone 271 is recorded in a recording unit 220 by operating a record button.

The output unit 273 displays a variety of information including the diagnosing status and the diagnosis result for the home appliance. Further, the output unit 273 can output an alarm or an effect sound. In embodiments, the method of setting a home appliance for diagnosing the home appliance and the position where a signal is outputted from the home appliance are displayed on the screen of the output unit 273.

The microphone 271 receives sounds. When the product information is converted into a signal and outputted as sound by the home appliance, the diagnostic apparatus receives the signal outputted from the home appliance through the microphone 271 and inputs the signal to the recording unit 220.

When the home appliance and the diagnostic apparatus are connected through a network, in some cases, the communication unit 280 receives the signal transmitted from the home appliance.

The recording unit 220 records the signal received through the microphone 271. The recording unit 220 may record the signal received through the microphone 271 in a wave file format. In this configuration, the diagnostic apparatus may include a recording medium such as a RAM, a hard disk, or a Nand Flash Memory for recording the signal sound file.

The signal processing unit 230 extracts the product information by converting the input signal and transmits the product information to the diagnosing unit 250.

The signal processing unit 230 extracts the product information by demodulating and decoding the wave file in the signal, when the signal is recorded by the recording unit 220. Further, when the signal is received through the communication unit 280, the signal processing unit 230 can extract the product information by converting the signal in accordance with the communication type and the file format of the signal.

It is described hereafter when the signal processing unit 230 extracts the product information by converting the recorded signal.

The signal processing unit 230 stores bit stream data for the recorded analog signal, detects a preamble, and then extracts the product information on the basis of the preamble. In this process, the signal processing unit 230 extracts the product information by demodulating the recorded data and decoding the demodulated data.

The signal conversion in the signal processing unit 230 is an inverse conversion of the signal conversion performed by the home appliance 100. The home appliance 100 and the diagnostic apparatus may therefore convert data, using the same signal conversion system under mutual agreement. For example, the processing unit 230 can perform decoding, using a viterbi decoding algorithm in preparation for the encoding type of the home appliance. The signal processing unit 230 performs inverse conversion on an analog signal at a predetermined frequency band, using any one of a frequency deviation method, an amplitude shift method, and a phase shift method.

Further, the signal processing unit 230 detects an error, which is generated while a process is outputted from the home appliance, recorded, and stored, and determines whether the signal is normal, when the signal is recorded to the recording unit 220. Further, the signal processing unit 230 examines an error generated when the signal is received through a network.

The signal processing unit 230 examines whether the signal has been normally recorded or the recorded signal is normal, by analyzing the recorded data. Further, the signal processing unit 230 extracts the product information and examines whether the extracted product data is normal.

When detecting an error, the signal processing unit 230 performs a predetermined correcting process for correcting the error, but it may be difficult to restore normal data even if performing the correcting process, in some cases.

When the recorded signal or the extracted product information is not normal, the processing unit 230 inputs error information to the control unit 210 and the control unit 210 requests the home appliance to output a signal again by outputting that the signal recording has not been normally performed, through the output unit 273. In this process, the user may operating the home appliance again in accordance with the error information displayed on the terminal and the request for outputting a signal again to output a signal.

For a normal signal, the processing unit 230 finishes recording and the control unit 210 displays a message saying that the recording has been normally finished, through the output unit 273.

The skilled person will understand that a variety of techniques may be used for determining if the extracted data is normal. For example, portions of the extracted data may be compared with known data. The skilled person will understand that error checking techniques may be used to determine if the data has be successfully extracted. The term "normal" therefore indicates that extraction has been performed adequately—for example, passes predetermined checks or tests—and does not need to be repeated, for example.

The diagnosing unit 250 analyzes the product information extracted from the signal processing unit 230 and diagnoses the home appliance 100 on the basis of the analysis result. The diagnosing unit 250 performs diagnosing in cooperation with a data storage unit 260.

Control data 261 for the operation of the terminal 90, diagnosis data 262 including a diagnosis logic and a reference value for diagnosing the home appliance, product information 263 extracted by the signal processing unit 230, and diagnosis result data 264 obtained by the diagnosing unit 250 are stored in the data storage unit 260. The diagnosis data 262 may be stored for each type of home appliance to be diagnosed and the model of the home appliance.

The diagnosing unit 250 determines the status of the home appliance and whether there is a breakdown by analyzing the product information on the basis of the diagnosis data for diagnosing the home appliance, deduces the cause of the breakdown and a solution, and outputs a diagnosis result.

The control unit 210 displays the diagnosis result through the output unit 273. The diagnosis result from the diagnosing unit 250 is stored in the data storage unit 260. The diagnosis result includes the line with the breakdown, a list of causes of the breakdown according to probability, and a list of the broken parts, and also includes guide information on whether to send a person to service the appliance.

In embodiments, the control unit 210 requests data to the service center 200 through the communication unit 280, when additional diagnosis data for diagnosing the home appliance is required. When the data is received from the service center 200, the control unit 210 updates the diagnosis data of the data storage unit 260.

The control unit 210 may transmit the product information 263 stored through the communication unit 280 or the diagnosis result data 264 to the service center 200, in any one case of when a transmission request is inputted through the input unit 272, when data is supposed to be transmitted to the service center, and when there is a request from the service center.

Further, the control unit 210 transmits the diagnosis result to the terminal of the repairer who visits the home and checks and repairs the home appliance, through the communication unit 280.

Figure 3:
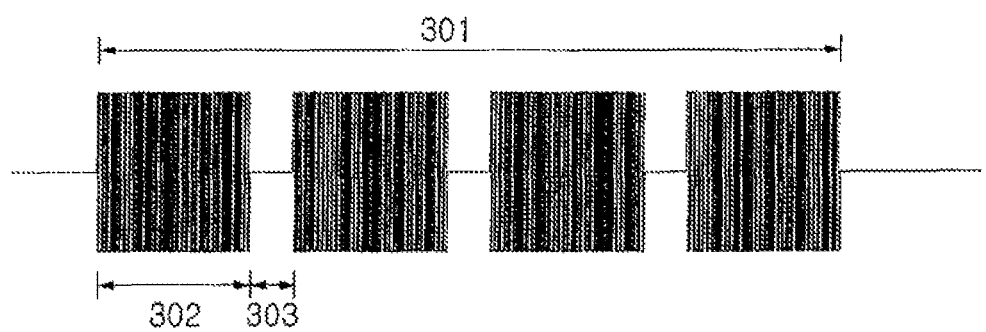
FIG. 3 is a diagram showing an example of a signal outputted from a home appliance.

FIG. 3 is a diagram showing an example of a signal outputted from a home appliance. By way of example only, there is disclosed a method of transmitting bit data (1's and 0's) using two different frequency sound waves, wherein a first frequency represents a 1 and a second frequency represents a 0. However, the skilled person will understand that other techniques—such as using two different amplitudes or using phase shift methods—are equally suitable for encoding and decoding bit data in accordance with the present disclosure. The skilled person will also understand that other types of wave are equally suitable. However, advantageous, the wave is a sound wave for compatibility with existing telephones and smart phones, for example.

A signal outputted from a home appliance is as that shown in FIG. 3. The home appliance constitutes product information in a plurality of frames and outputs the product information in a modulated signal.

The product information includes operation information including operation setting-up and operation status, use information, and breakdown information on malfunction. The product information is data composed of a combination of 0 or 1, and is converted into a signal by a modulator of the home appliance and then outputted. The product information is converted by the home appliance and outputted in a plurality of frames comprising of a plurality of "symbols".

In the signal, the smallest unit of data having meaningful information is a "symbol". In embodiments, the symbol comprises one frequency but, as explained above, the symbol may equally comprise one amplitude for example. The time of outputting one symbol is herein referred to as a symbol time. The home appliance outputs a frequency signal designated for one symbol for the symbol time. For example, the signal has one of two frequencies, 2.6 Khz and 2.8 Khz. The signal may therefore be considered as comprising a plurality of frequencies, optionally, a sequence of frequencies.

In the pulse constituting the frequency signal corresponding to the symbol, the cycle is determined by the frequency response of the sound output unit in the home appliance, in which the numbers of pulses disposed in the same time section at the same frequency are the same.

The portable terminal that receives a signal in an audio frequency band performs sampling after receives a sound signal, so that the time length of the symbol should not be less than a predetermined level. Therefore, the number of pulses included in each symbol is set to be at least 8 or more and the symbol time is set to be 3 ms or more. The number of pulses per symbol may be set within the range of 8 to 67.

When the symbol time is less than 7 ms, the portable terminal may fail to obtain a signal outputted from the home appliance and generate a recognition error, and when the symbol time is over 24 ms, the length of the signal outputted from the home appliance becomes too large. Therefore, considering the recognition rate, the symbol time may be set within the range of 7 ms to 24 ms, and the symbol time may be set to 12 ms in consideration of an error rate and a transmission speed.

The total length 301 of the output signal is determined at a predetermined level. The time of outputting one frame is a frame time 302 and a plurality of frames have the same frame time. An IFS (Inter Frame Space) 303 is set between the frames. The IFS is a section where a signal is not outputted between the frames and is provided for minimizing distortion or transformation of a signal.

Each frame includes a preamble. The preamble shows the start of one frame and may be formed in various patterns. For example, the pattern of the preamble may be a 0x0FF0 pattern.

The terminal stores in advance the information on the symbol time, the frame time, the total length, and the preamble for a signal outputted from the home appliance, and analyzes the input signal and determines whether the signal is normal on the basis of the information. The information on the output signal may be stored under a preliminary agreement, and in some cases, it may be possible to store the information by mutual data information or to receive and store the information from the service center.

Figure 4:
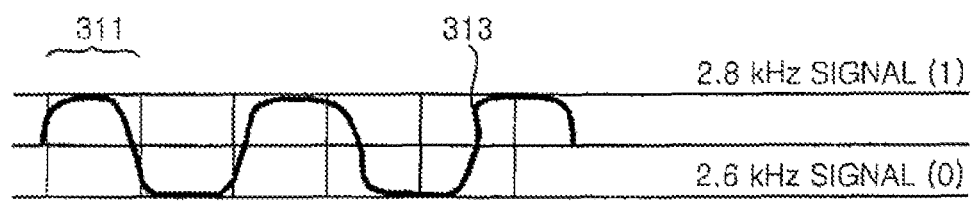
FIGS. 4 and 5 are diagrams referred to describe a process of processing a signal that extracts product information from a signal outputted by a home appliance.
Figure 5:
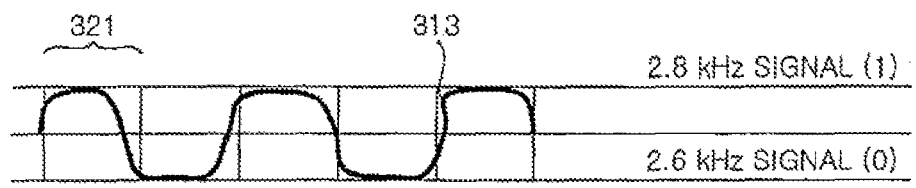

FIGS. 4 and 5 are diagrams referred to describe a process of processing a signal that extracts product information from a signal outputted from a home appliance.

The signal processing unit 230 designates the start position of a normal signal including product information from an input signal. That is, since all the information from start to the final of the input signal is not included, the point where the actual data including the information, that is, the product information is sensed first. The signal processing unit 230 may sense the portion where the signal rapidly changes or the point where a signal having a specific frequency is shown, as the start position.

The processing unit 230 finally determines the start position by determining whether the sensed start position is the position where the actual product information starts, in accordance with the maintenance time of the signal or the signal pattern.

When the start position is detected, the signal processing unit 230 extracts the product information by determining the bit value for the signal on the basis of the start position and performing signal conversion.

Referring to FIG. 4, the signal processing unit 230 divides the input signal 313 into predetermined signal symbols 311, having an symbol time, to set a plurality of sections, on the basis of the start position, and then designates a point for each section and reads the signal value of a corresponding point, thereby determining the bit value. It is possible to determine the bit value as probability for the points by setting one center point for each section or a plurality of points at regular symbols.

The bit value is determined as 1 or 0 in accordance with the signal values in the sections, and for example, the frequencies 2.8 Khz and 2.6 Khz are converted into 1 and 0, respectively.

The signal symbol 311 defines a section wherein the bit value is determined. The signal symbol 311 may be referred to as the "symbol time". That is, the home appliance generates a signal having one of two predetermined frequencies on the basis of the symbol time, and outputs the signal after setting the frequency to one frequency for one bit, when outputting the product information. One frequency may be set for two bits in accordance with the kind of the used frequency, but 1 is converted into the first frequency and 0 is converted into the second frequency, when two frequencies are used. Since the time of outputting one frequency is the symbol time, the terminal determines the bit values by dividing the signal on the basis of the symbol time.

The skilled person will immediately understand that more than two frequencies may be used to represent possible data values and reference to a two frequency system is by way of example only.

The signal processing unit 230 extracts the product information formed by combining the bit values of the sections, by setting a plurality of sections by dividing the signal into predetermined symbols in accordance with the signal symbol (the symbol time). The signal processing unit 230 can finally extract the product information by further performing deinterleaving or error checking.

However, frequency shift may occur when a signal is transmitted owing to features of the network, or the features of a frequency generator or a synchronizing signal generator in the diagnostic apparatus. That is, even if the home appliance outputs a signal with a predetermined symbol time, a problem of change of the symbol time is generated by the frequency shift in the diagnostic apparatus.

Further, the frequency may be changed, in which the signal processing unit 230 may detect the optimal frequency by finding out a target frequency, by performing summing-up with respect to the transverse axis.

Due to the frequency shift in a signal inputted to the terminal, even if the signal symbol is set to the designated symbol time, as shown in FIG. 4, when it is difficult to check the bit value of the signal in one section as going to the end of the signal, the symbol time of the input signal has been changed; therefore, the signal processing unit 230 changes the symbol time, for converting the signal.

The signal processing unit 230 sets a first symbol, or symbol, time for the input signal and sets a section in accordance with the first symbol time with respect to the detected start position. The signal processing unit 230 may set the first symbol time with respect to the frame time, when setting the first symbol time.

The signal processing unit 230 determines whether it is normal, after determining the bit value on the basis of the first symbol time, and when it is not normal, the signal processing unit 230 determines again whether it is normal, after increasing or decreasing the symbol time.

When it is not possible to calculate a normal bit value for the first symbol, or symbol, time 311 in FIG. 4, it may be possible to determine the bit value for on the basis of a second symbol time 321, as shown in FIG. 5.

Figure 6:
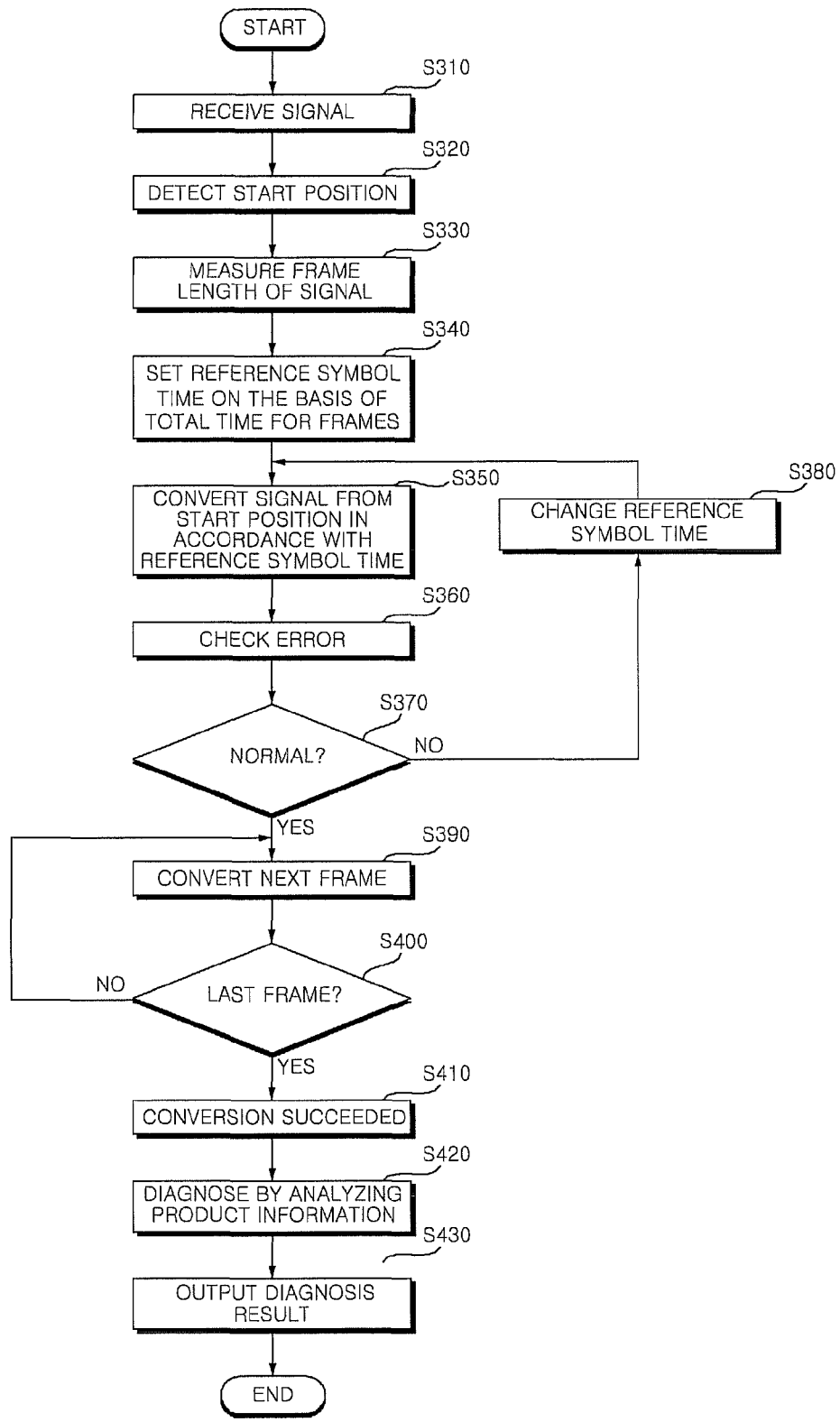
FIG. 6 is a flowchart illustrating a signal conversion method when extracting product information from a signal outputted by a home appliance.

FIG. 6 is a flowchart illustrating a signal conversion method when extracting product information from a signal outputted from a home appliance.

Referring to FIG. 6, when a signal is inputted through the microphone 271 or the communication unit (S310), the signal processing unit filters the input signal and removes noise (S320), and then detects a start position where meaningful information, that is, product information starts by sensing the point where the signal rapidly changes and detecting the first frequency or the second frequency (S320).

The signal processing unit 230 measures the frame length of the signal from the start position. Since the input signal is composed of a plurality of frames, as described above with reference to FIG. 3, it is possible to divide the frames with respect to the section where the signal is not outputted.

The signal processing unit 230 sets the total time for the frames, that is, a first symbol time with respect to the frame time (S340). Since the number of symbols included in one frame is determined, the processing unit calculates the first symbol time by dividing the frame time by the number of symbols. In some cases, the signal processing unit may set the default symbol time, that the symbol time at the output of the home appliance as the first symbol time, and then increase or decrease the first symbol time by stages.

The signal processing unit 230 sets sections for the signal from the start position according to the first symbol time and converts the analogue signal into a digital signal by setting the bit value for each section, thereby generating a resultant signal (S350).

When conversion for one frame is finished, the signal processing unit 230 checks an error from the generated resultant signal (S360). It is possible to check an error, using a check bit included in each frame.

The signal processing unit 230 determines whether the frame is normal on the basis of the result of checking an error, and when the frame is not normal, the processing unit 230 increases or decreases the symbol time (S380), and converts the signal in accordance with the changed symbol time and checks an error of from the generated resultant signal again (S350 and S360).

Meanwhile, when the resultant signal is normal, the signal processing unit 230 determines the symbol time as the optimal symbol time, and then performs frame conversion by determining a bit value by setting a section at the same symbol time for the other frames (S390).

When the conversion is finished for the last frame (S400), the signal processing unit 230 determines that the conversion has been normally finished (S410), and extracts the product information by performing an additional process such as deinterleaving.

Optionally, the method may continue by performing analysis on the successfully extracted product data, such as diagnosis of the home appliance. However, the skilled person will understand that aspects of the present disclosure relate to the improved method and device for extracting the product information.

The diagnosing unit 250 may determine the kind and the model of the home appliance in response to the product information, and then analyzes the product information and diagnoses the home appliance, using corresponding diagnosis data and diagnosis logic (S420). The diagnosing unit 250 analyzes the status of the home appliance or the cause of a breakdown and deduces a corresponding solution as the diagnosis result (S430).

Figure 7:
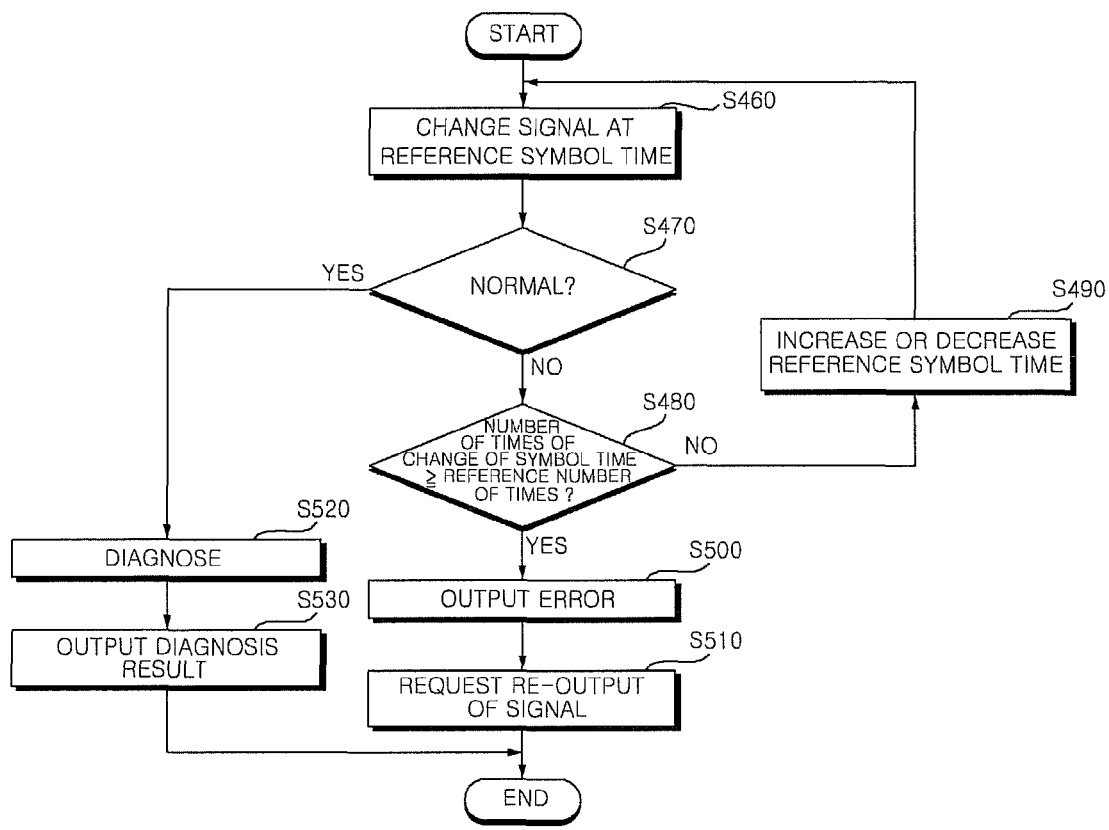
FIG. 7 is a flowchart illustrating an error estimation method for a signal outputted by a home appliance in the signal conversion method of FIG. 6.

Optionally, the method may continue by displaying the result of the diagnostic. The deduced diagnosis result may be outputted through the output unit 273 by the control unit 210. Therefore, the user can see the diagnosis result from the screen of the terminal 90. For the diagnostic server of the service center, the diagnosis result is outputted to the display unit of the diagnostic server and the clerk may check and inform the user of the result by voice or may transmit the result to the user. FIG. 7 is a flowchart illustrating an error estimation method for a signal outputted from a home appliance in the signal conversion method of FIG. 6.

Referring to FIG. 7, as described above, the signal processing unit 230 determining bit values by setting the sections at regular signal symbols for a signal at the first symbol time, thereby converting the signal and outputting a resultant signal (S460).

The signal processing unit 230 determines whether the resultant signal is normal by checking an error from the resultant signal implemented by combining the bit values of the sections (S470). The skilled person will understand how to determine that the resultant signal is "normal" using error checking techniques, for example.

When the resultant signal is not normal, as a result of error check, the control unit 210 determines whether the number of times of change of the symbol time is a threshold number of times or more (S480).

When the number of times of change of the symbol time is less than the threshold number of times, the signal processing unit 230 performs signal conversion again (S460) by increasing or decreasing the symbol time (S490). In this process, the control unit 210 increases the number of times of change of the symbol time by one.

The signal processing unit 230 determines again whether the signal conversion result according to the changed symbol time is normal (S470), and the control unit 210 checks again whether the number of times of change of the symbol time is than the threshold number of times or more, when it is determined that the error check result after the signal conversion is not normal.

The symbol time may be increased for the second extraction or it may be decreased. In an embodiment, the second symbol time (for a second extraction) is greater than the first symbol time (for the first extraction), and the third symbol time (for a third extraction) is less than the first symbol time (for the first extraction) and second symbol time. In an alternative embodiment, the second symbol time is less than the first symbol time, and a third symbol time is greater than the first symbol time and second symbol time. In an embodiment, the even (i.e. second, fourth, sixth, eighth etc) symbol times are greater than the first symbol time and the odd (i.e. third, fifth, seventh, ninth etc) symbol times are less than the first symbol time, or vice versa. The difference between the first symbol time and subsequent symbol times may become greater with each iteration. Accordingly, the number of iterations required to determine the symbol time required to give a normal resultant signal is reduced.

However, when the number of times of change of the symbol time is than the threshold number of times or more, the control unit 210 stops the signal conversion by the signal processing unit 230 and outputs an error (S500). The control unit 210 outputs a signal conversion error through the output unit 273 and outputs a message requesting the home appliance to output a signal again or outputs related voice or effect sound (S510).

On the other hand, when the error check result is normal, the diagnosing unit 250 may diagnose the home appliance on the basis of the extracted product information (S520) and outputs the diagnosis result (S530).

There is provided a diagnostic apparatus arranged to: receive and divide an input signal into a plurality of first sections, each first section having a first signal symbol; determine a bit value associated with first sections of the input signal; perform an error check on at least one bit value obtained in accordance with the first signal symbol; and, if an error is detected, divide the input signal into a plurality of second sections, each second section having a second signal symbol not equal to the first signal symbol, and determining a bit value associated with the input signal in each second section; and combine the bit values obtained from the input signal in accordance with the second signal symbol to form a resultant signal.

Therefore, it is possible to determine an improved symbol time by changing the symbol time and convert the signal, even if it is difficult to normally extract the product information of the home appliance due to distortion of frequency shift in the input signal, so that it is possible to easily extract the product information. Accordingly, the accuracy of the diagnosis result is improved, so that it is possible to more accurately diagnose the status of the home appliance, and accordingly, it is possible to provide an after-sales service for breakdown of the home appliance and improve reliability of the product by improving the accuracy of the diagnosis result.

As described above, although diagnostic apparatus and method for home appliance according to the present disclosure were described with reference to the accompanying drawings, the present disclosure is not limited to the embodiments described herein and the accompanying drawings and may be modified within the protection range of the scope of the present disclosure.

What is claimed is:

1. A diagnostic apparatus for diagnosing a home appliance in response to a signal, comprising a plurality of frequencies, received from the home appliance, the diagnostic apparatus comprising:
   a microphone through which the signal is input, the signal having been output in the form of a sound signal having the plurality of frequencies by the home appliance and transmitted to the diagnostic apparatus via a communication network;
   a signal processor that sets a symbol time and extracts product information from the signal by converting the signal based on the symbol time defining times for determining a value associated with the signal;
   a diagnosing device that diagnoses the home appliance by analyzing the product information and outputs a status of the home appliance;
   a processor that outputs a plurality of explanations for the diagnosis of the home appliance and a diagnosis result;
   a data storage device that stores diagnosis data and the diagnosis result; and
   an output that displays a variety of information including a diagnosing status, the plurality of explanations, and the diagnosis result for the home appliance, wherein the signal processor sets the symbol time to a first symbol time as a predetermined time and determines that an error occurred due to noise or distortion of a frequency shift generated during transfer of the signal from the home appliance to the diagnostic apparatus, wherein when an error occurs with an error check result on a resultant signal generated after signal conversion at the first symbol time, the signal processor changes and sets the symbol time to a second symbol time, repeats changing the symbol time by increasing or decreasing the symbol time, until the error check result is normal, extracts the product information from the signal using the symbol time when the error check result is normal, wherein the first symbol time is set and stored as information for a signal output by the home appliance when the signal is outputted, and wherein the signal processor sets the symbol time with respect to a frame time of one frame in a plurality of frames constituting the signal, and divides the frame time by a number of symbols per frame in the signal.

2. The diagnostic apparatus of claim 1, wherein the product information of the home appliance includes at least one of identification information, setting-up information, operation information, or malfunction information, and wherein the status of the home appliance includes at least one selected from the group comprising whether there is a breakdown, a cause of the breakdown, and a solution as the diagnosis result.

3. The diagnostic apparatus of claim 1, wherein the processor counts a number of times of change of the symbol time when the symbol time is changed, and when the error check result is not normal, determines whether the number of times of change of the symbol time is a threshold number of times or more, and outputs an error and requests re-output of the signal when the threshold number of times is reached.

4. The diagnostic apparatus of claim 1, wherein the signal processor divides the signal into a plurality of sections, with symbols of the symbol time, determines a bit value associated with each section of the plurality of sections, determines a start position of the signal from which the signal starts, and generates a resultant signal by combining the bit values determined for each of the plurality of sections.

5. The diagnostic apparatus of claim 1, wherein the signal processor performs signal conversion using the first symbol time for a first frame in a plurality of frames constituting the product information, signal conversion for the other frames when the symbol time is determined, and then generates the product information by combining resultant signals generated for each of the plurality of frames.

6. The diagnostic apparatus of claim 1, wherein the diagnostic apparatus is any one of a portable terminal, in which a diagnosis program and diagnosis data are locally installed, or a diagnostic server connected to a service center for the home appliance.

7. The diagnostic apparatus of claim 1, further comprising a recorder that records the signal received through the microphone.

8. The diagnostic apparatus of claim 7, wherein the recorder records the signal received through the microphone in a wave file in a wave file format, and wherein the signal processor extracts the product information by demodulating and decoding the wave file.

9. The diagnostic apparatus of claim 8, wherein the recorder includes a Random Access Memory (RAM), a hard disk, or a NAND Flash Memory in which the signal is recorded.

10. The diagnostic apparatus of claim 1, wherein the data storage device that includes a diagnosis data storage device that stores the diagnosis data including a diagnosis logic and reference data to diagnose the home appliance;
a product information storage device that stores the product information extracted by the signal processor; and
a diagnosis result data storage device that stores the diagnosis result diagnosed by the diagnosing device.

11. A diagnostic method for a home appliance, comprising:
receiving via a microphone of a diagnostic apparatus a signal, comprising a plurality of frequencies, from a home appliance, the signal having been output in the form of a sound signal having the plurality of frequencies by the home appliance and transmitted to the diagnostic apparatus via a communication network;
generating via a signal processor of the diagnostic apparatus a first resultant signal by converting the signal based on a first symbol time, which is set by the home appliance, defining times for determining a value associated with the signal;
determining via a diagnosing device of the diagnostic apparatus whether the first resultant signal is normal by performing an error check;
when the error check result indicates that the first resultant signal is not normal, changing via the signal processor the symbol time to a second symbol time defining times for determining a value associated with the signal;
performing signal conversion again, via the signal processor, to generate a second resultant signal based on the second symbol time; and
via a processor of the diagnostic apparatus, extracting product information from the second resultant signal when the error check result of the second resultant signal is normal, diagnosing the home appliance on the basis of diagnosis data and the product information, and outputting a diagnosis result, wherein when it is determined that the signal conversion has failed due to noise or distortion of a frequency shift generated during transfer of the signal from the home appliance, the signal conversion is performed again by increasing or decreasing the symbol time by a predetermined level until the error check result is normal, wherein the first symbol time is stored as information for a signal output from the home appliance, and wherein the first symbol time is set by dividing a frame time by a number of symbols per frame in the signal with respect to the frame time of one frame of a plurality of frames constituting the product information.

12. The diagnostic method of claim 11 wherein the diagnostic result includes a cause of a breakdown and a solution.

13. The diagnostic method of claim 11, wherein the signal conversion using the first symbol time is performed on a first frame in a plurality of frames constituting the product information, wherein the signal conversion is performed on a second frame of the plurality of frames based on the second symbol time, and wherein the product information is extracted by combining resultant signals generated from each of the plurality of frames.

14. The diagnostic method of claim 11, further comprising:
counting a number of times of change of the symbol time when the symbol time is changed; and
when the error check result is not normal, determining whether the number of times of change of the symbol time is a threshold number of times or more, and outputting an error and request re-output of the signal by the home appliance, when the number of times of change of the symbol time is the threshold number of times or more.

15. A diagnostic system for diagnosing a home appliance, comprising:

a home appliance that outputs product information required for fault diagnosis as a sound signal comprising a plurality of frequencies, and a diagnostic apparatus that receives the sound signal and extracts the product information from the sound signal, diagnoses the home appliance on the basis of the product information, and outputs a diagnosis result, wherein the diagnostic apparatus, comprising:

a microphone through which the sound signal is input, the signal having been output in the form of the sound signal having the plurality of frequencies by the home appliance and transmitted to the diagnostic apparatus via a communication network;

a signal processor that sets a symbol time and extracts product information from the sound signal by converting the sound signal based on the symbol time defining times for determining a value associated with the signal;

a diagnosing device that diagnoses the home appliance by analyzing the product information and outputs a status of the home appliance;

a processor that outputs a plurality of explanations for the diagnosis of the home appliance and a diagnosis result;

a data storage device that stores the diagnosis result; and an output that displays a variety of information including a diagnosing status, the plurality of explanations, and the diagnosis result for the home appliance, wherein the signal processor sets the symbol time to a first symbol time as a predetermined time and determines that an error has occurred due to noise or distortion of a frequency shift generated during transfer of the sound signal from the home appliance to the diagnostic apparatus, wherein when an error occurs with an error check result on a resultant signal generated after signal conversion at the first symbol time, the signal processor changes and sets the symbol time to a second symbol time, repeats changing the symbol time by increasing or decreasing the symbol time, until the error check result is normal, extracts the product information from the sound signal using the symbol time when the error check result is normal, wherein the first symbol time is set and stored as information for a signal output by the home appliance when the sound signal is output, and wherein the signal processor sets the symbol time with respect to a frame time of one frame in a plurality of frames constituting the signal, and divides the frame time by a number of symbols per frame in the signal.

16. The diagnostic system of claim 15, wherein the signal processor divides the sound signal into a plurality of sections, with symbols of the symbol time, determines a bit value associated with each section of the plurality of sections, determines a start position of the sound signal from which the sound signal starts, and generates a resultant signal by combining the bit values determined for each of the plurality of sections.

17. The diagnostic system of claim 15, wherein the signal processor performs signal conversion using the first symbol time for a first frame in a plurality of frames constituting the product information, signal conversion for the other frames when the symbol time is determined, and then generates the product information by combining resultant signals generated for each of the plurality of frames.

18. A diagnostic method for a diagnostic system, the method comprising:

outputting via a home appliance a product information as a sound signal;

receiving via a microphone of a diagnostic apparatus the sound signal, comprising a plurality of frequencies, from the home appliance, the signal having been output in the form of the sound signal having the plurality of frequencies by the home appliance and transmitted to the diagnostic apparatus via a communication network;

generating via a signal processor of the diagnostic apparatus a first resultant signal by converting the sound signal based on a first symbol time, which is set by the home appliance, defining times for determining a value associated with the sound signal;

determining via a diagnosing device of the diagnostic apparatus whether the first resultant signal is normal by performing an error check;

when the error check result indicates that the first resultant signal is not normal, changing via the signal processor the symbol time to a second symbol time defining times for determining a value associated with the signal;

performing signal conversion again, via the signal processor, to generate a second resultant signal based on the second symbol time; and via a processor of the diagnostic apparatus, extracting product information from the second resultant signal when the error check result of the second resultant signal is normal, diagnosing the home appliance, and outputting a diagnosis result, wherein when it is determined that the signal conversion has failed due to noise or distortion of a frequency shift generated during transfer of the sound signal from the home appliance, the signal conversion is performed again by increasing or decreasing the symbol time by a predetermined level until the error check result is normal, wherein the first symbol time is stored as information for a signal output from the home appliance, and wherein the first symbol time is set by dividing a frame time by a number of symbols per frame in the signal with respect to the frame time of one frame of a plurality of frames constituting the product information.

* * * * *